United States Patent
Cornils et al.

(10) Patent No.: US 10,091,660 B2
(45) Date of Patent: Oct. 2, 2018

(54) LTE PREEMPTION

(71) Applicant: W5 Technologies, Inc., Scottsdale, AZ (US)

(72) Inventors: Curt Cornils, Chandler, AZ (US); Roger Dendy, Phoenix, AZ (US); Peter Emmons, Mesa, AZ (US); Jason Ferguson, Tempe, AZ (US)

(73) Assignee: W5 Technologies, Inc., Scottsdale, AZ (US)

( * ) Notice: Subject to any disclaimer, the term of this patent is extended or adjusted under 35 U.S.C. 154(b) by 37 days.

(21) Appl. No.: 15/234,945

(22) Filed: Aug. 11, 2016

(65) Prior Publication Data

US 2017/0048716 A1 Feb. 16, 2017

Related U.S. Application Data

(60) Provisional application No. 62/204,110, filed on Aug. 12, 2015.

(51) Int. Cl.
*H04W 4/00* (2018.01)
*H04W 16/14* (2009.01)
*H04W 56/00* (2009.01)
*H04W 12/08* (2009.01)

(52) U.S. Cl.
CPC ....... *H04W 16/14* (2013.01); *H04W 56/0005* (2013.01); *H04W 12/08* (2013.01)

(58) Field of Classification Search
CPC .. H04W 16/14; H04W 56/0005; H04W 12/08
USPC ......... 370/280–345; 455/450–454, 501–522
See application file for complete search history.

(56) References Cited

U.S. PATENT DOCUMENTS

| | | | | |
|---|---|---|---|---|
| 8,265,551 | B2 * | 9/2012 | Saito | H04B 7/15507 370/310 |
| 8,467,723 | B2 * | 6/2013 | Saito | H04B 7/15507 370/310 |
| 8,824,366 | B2 * | 9/2014 | Lee | H04J 11/0069 370/206 |
| 9,374,837 | B2 * | 6/2016 | Narasimha | H04W 74/008 |
| 9,608,710 | B2 * | 3/2017 | Fwu | H04L 5/14 |
| 2008/0080463 | A1 * | 4/2008 | Stewart | H04J 11/0069 370/342 |
| 2016/0242083 | A1 * | 8/2016 | Guan | H04W 24/08 |
| 2016/0337998 | A1 * | 11/2016 | Kim | H04W 56/0005 |

* cited by examiner

*Primary Examiner* — Man Phan
(74) *Attorney, Agent, or Firm* — Snell & Wilmer L.L.P.

(57) ABSTRACT

An LTE preemption system may allow authorized users to access LTE spectrum when needed by the authorized users and allow commercial users to access the LTE spectrum when not in use by the authorized users. An authorized transmission unit may transmit noise in at least one of a primary synchronization channel, a secondary synchronization channel, or a physical broadcast channel. The noise may prevent commercial users from accessing the LTE spectrum. At least one of the primary synchronization channel, the secondary synchronization channel, or the physical broadcast channel may be offset by a known time or frequency, and authorized devices may utilize the LTE spectrum by searching for the channels at the offset locations.

12 Claims, 2 Drawing Sheets ns and methods are disclosed for preempting the LTE spectrum. An LTE tower may be broadcasting a primary synchronization channel, a secondary synchronization channel, and a physical broadcast channel. An authorized transmission unit may broadcast noise over at least one of the primary synchronization channel, the secondary synchronization channel, or the physical channel. At least one of the channels may be offset by a frequency or time. An authorized device may search for the channels at the offset location. The authorized device may connect to the LTE network. Commercial devices may receive an invalid signal at the original channel locations, and the commercial devices may switch to a different spectrum to connect to the LTE network.

LTE PREEMPTION

CROSS REFERENCE TO RELATED APPLICATIONS

The present application claims priority to U.S. Provisional Application No. 62/204,110 entitled "LTE PREEMPTION" and filed on Aug. 12, 2015, the contents of which are incorporated by reference herein in their entirety.

FIELD

The present disclosure relates to wireless technology, and more particularly, to LTE spectrum sharing.

BACKGROUND

Long-Term Evolution ("LTE"), sometimes referred to as "4G" or "4G LTE," is a standard for wireless communication of high-speed data for mobile phones and data terminals. LTE utilizes digital signal processing techniques and modulations to provide increased speed and capacity for wireless data networks. Standard frequency bands have been established. For example, in North America, 700, 750, 800, 850, 1900, 1700/2100 (AWS), 2500, and 2600 MHz are among the standard frequency bands used.

It is vital that public safety and other government functions have access to spectrum in LTE systems. Currently, a significant portion of the LTE spectrum is reserved for government use. However, as the commercial demand for LTE spectrum increases, it would be beneficial to allow commercial users to access LTE spectrum reserved for the government when not in use. However, the government must still be able to access the LTE spectrum when needed.

SUMMARY

Systems and methods are disclosed for preempting the LTE spectrum. An LTE tower may be broadcasting a primary synchronization channel, a secondary synchronization channel, and a physical broadcast channel. An authorized transmission unit may broadcast noise over at least one of the primary synchronization channel, the secondary synchronization channel, or the physical channel. At least one of the channels may be offset by a frequency or time. An authorized device may search for the channels at the offset location. The authorized device may connect to the LTE network. Commercial devices may receive an invalid signal at the original channel locations, and the commercial devices may switch to a different spectrum to connect to the LTE network.

A method may comprise transmitting noise in a channel of an LTE network, wherein the channel is selected from a group consisting of: a primary synchronization channel, a secondary synchronization channel, or a physical broadcast channel; and offsetting the channel by at least one of a frequency or a time.

In various other embodiments, the noise may be transmitted by an authorized transmission unit. The authorized transmission unit may transmit the noise at a signal strength greater than the signal strength of an LTE tower in a cell encompassing the LTE tower and the authorized transmission unit. The transmitting noise may prevent a commercial device from synchronizing with a tower in the LTE network. Noise may be transmitted in the primary synchronization channel, the secondary synchronization channel, and the physical broadcast channel. The channel may be offset by an offset frequency. The method may comprise synchronizing with an authorized device at the offset frequency. The channel may be offset by an offset time. The method may comprise synchronizing with an authorized device at the offset time. The method may comprise transmitting a bogus synchronization signal. The bogus synchronization signal may provide incorrect cell ID information.

An LTE device may comprise a transmission module, and an offset module, wherein the offset module stores at least one of an offset frequency or an offset time.

In various embodiments, the LTE device may comprise a standard mode and an authorized mode. In the standard mode the LTE device may be configured to communicate over a commercial LTE network using standard communications procedures. In the authorized mode the LTE device may be configured to communicate over an LTE network using the offset frequency or the offset time. The LTE device may be configured to locate at least one of a primary synchronization channel, a secondary synchronization channel, or a physical broadcast channel at the offset frequency. The LTE device may be configured to locate at least one of a primary synchronization channel, a secondary synchronization channel, or a physical broadcast channel at the offset time. The LTE device may be configured to ignore a bogus synchronization signal transmitted by an authorized transmission unit. The LTE device may be configured to search for a secondary synchronization channel in a fifth symbol of slot 0 of subframe 1 of an LTE frame. The LTE device may be configured to automatically switch to the authorized mode in response to detecting noise in at least one of a primary synchronization channel, a secondary synchronization channel, or a physical broadcast channel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Systems and methods for preempting access to LTE spectrum are disclosed. Authorized users may wish to access LTE spectrum ordinarily used for commercial purposes. Authorized users may be entities such as the department of defense, police, firefighters, weather services, emergency broadcast systems, other governmental organizations, or any other group of users. Authorized users may not need significant spectrum at most times. However, in the event of emergency or other critical time, authorized users may be ensured of access to LTE spectrum used for commercial purposes, such as by wireless carriers (e.g. Verizon®, AT&T®, etc.).

The system may deny access to the LTE spectrum to commercial users when needed by authorized users. The denial of services may be achieved by a variety of methods disclosed in further detail herein. The system may make the LTE spectrum available to authorized users. Thus, the authorized users may be able to access LTE spectrum when needed, while allowing both commercial and authorized users to utilize the LTE spectrum when priority access is not required by the authorized users.

Figure 1:
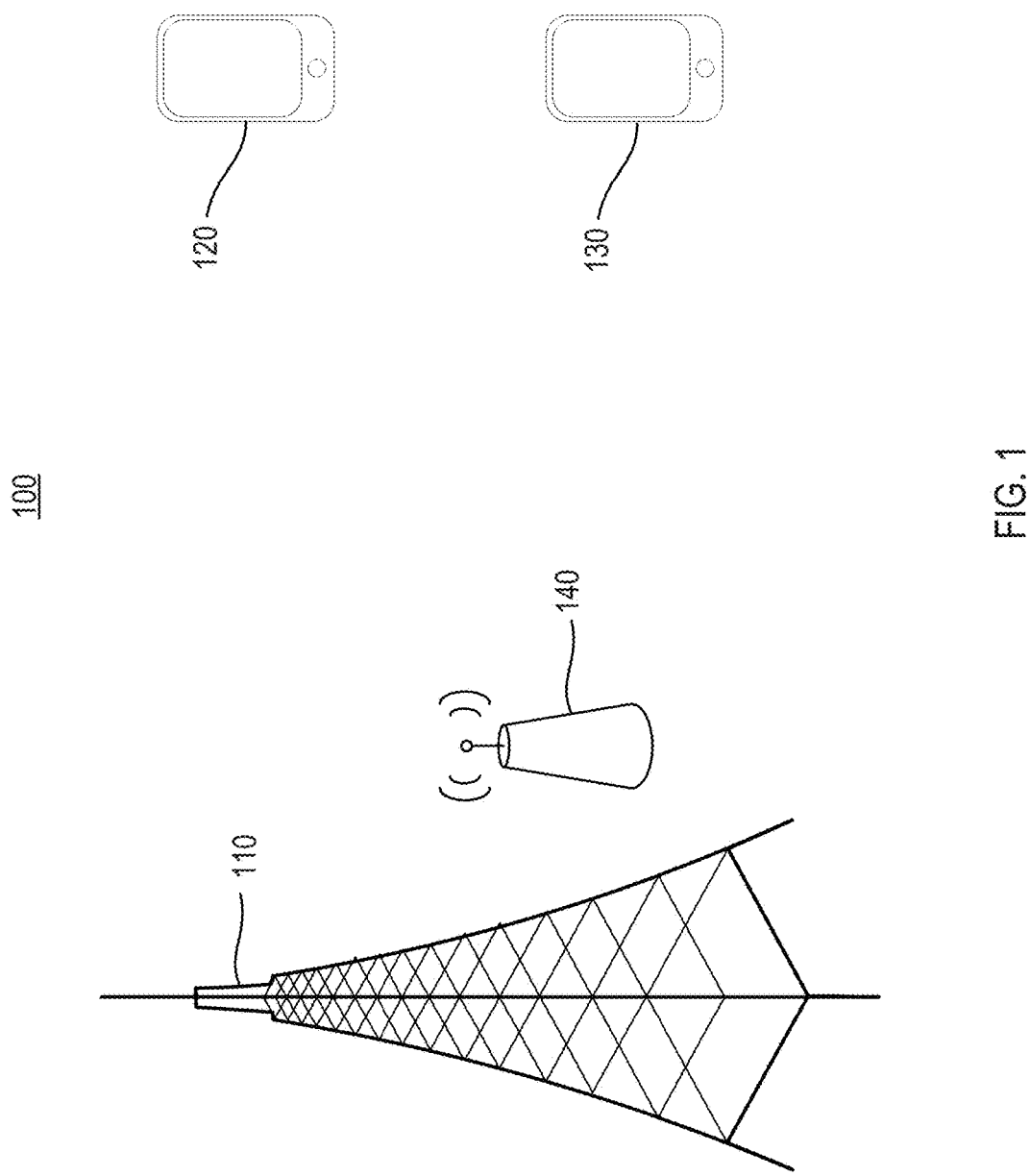
FIG. 1 illustrates a schematic view of a system for LTE preemption in accordance with various embodiments.

Referring to FIG. 1, a system 100 for LTE preemption is illustrated according to various embodiments. The system 100 may comprise an LTE tower 110. The LTE tower 110 may wirelessly communicate with mobile devices, such as a commercial device 120 and an authorized device 130. The LTE tower 110 may connect to a network to allow access to the intern& and cellular services. The LTE tower 110 may comprise an Evolved Node B ("eNodeB") which is hardware that communicates directly with mobile devices. The area serviced by the LTE tower 110 is referred to as a cell. The commercial device 120 may be a cellular telephone used by the general public to communicate via the LTE tower 110. The system 100 may further comprise an authorized transmission unit 140. The authorized transmission unit 140 may transmit a signal which overrides the signal from the LTE tower 110 and prevents the commercial device 120 from connecting to the network, while allowing the authorized device 130 to connect to the network. In various embodiments, the authorized transmission unit 140 may be a mobile unit which may be placed in the location where LTE preemption is desired for authorized users. However, in various embodiments, the authorized transmission unit 140 may be at a fixed location. For example, an authorized transmission unit 140 may be located within each cell in an LTE network.

The authorized device 130 may be a cellular phone, a laptop, or any other device capable of communicating over a commercial LTE network, or over a substitute LTE cell generated by the authorized transmission unit 140. The authorized device 130 may comprise a transmission module configured to transmit and receive signals from the LTE tower 110. In various embodiments, the authorized device 130 may comprise a standard mode and an authorized mode. In the standard mode, the authorized device 130 may communicate over the commercial LTE network using standard communications procedures, similar to those used by the commercial device 120. In the authorized mode, the authorized device 130 may communicate over the commercial LTE network or a substitute LTE cell using modified procedures, as further discussed herein. The authorized device 130 may comprise an offset module which stores an offset frequency or time, which allows the authorized device to communicate with the LTE tower 110 and/or substitute LTE cell in authorized mode. The authorized device 130 may comprise a switch which allows a user to switch between the standard mode and the authorized mode. In various embodiments, the authorized device may be configured to automatically switch to the authorized mode in response to detecting noise in at least one of a primary synchronization channel ("PSCH"), a secondary synchronization channel ("SSCH"), or a physical broadcast channel ("PBCH").

Figure 2:
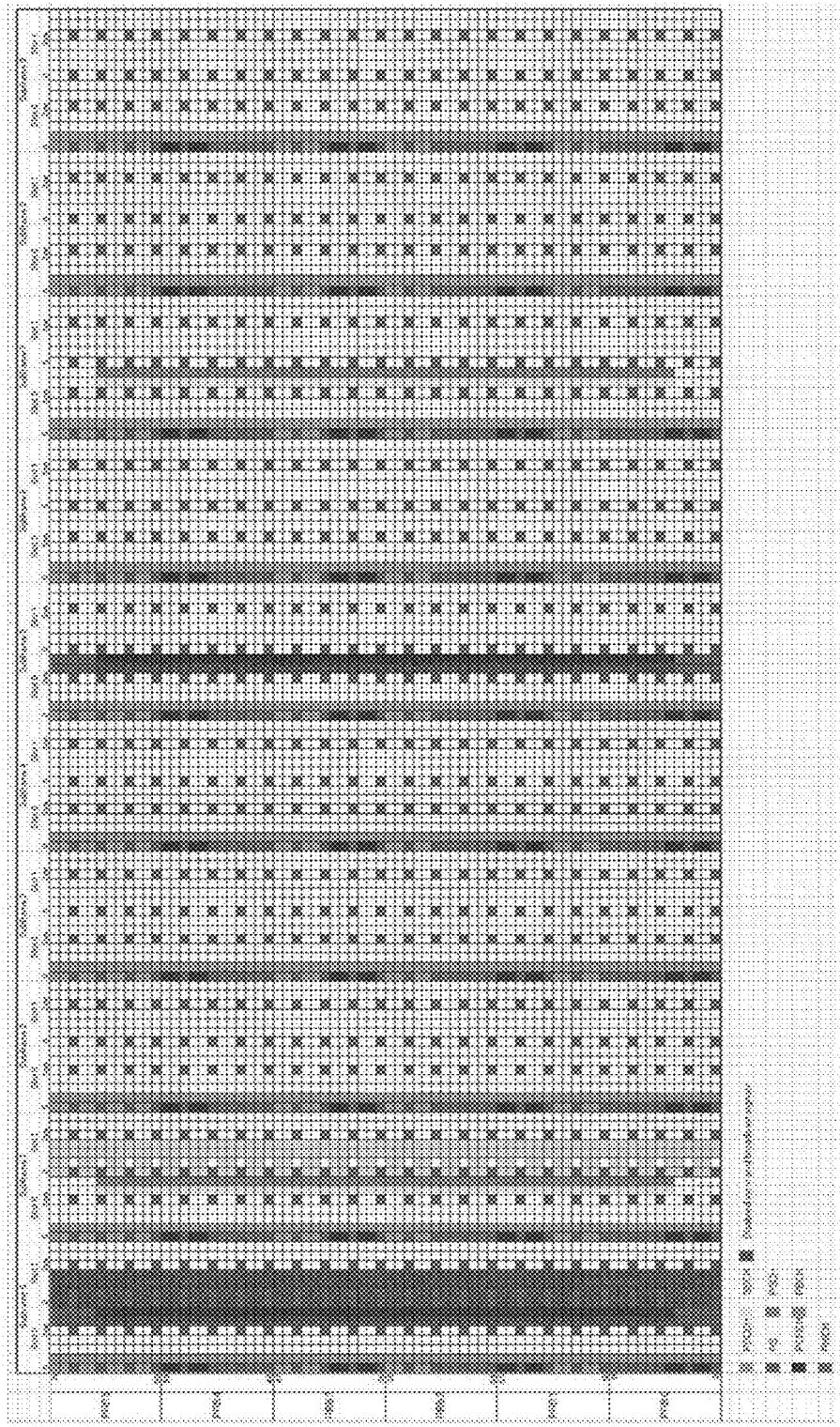
FIG. 2 illustrates an LTE radio frame in accordance with various embodiments.

Referring to FIG. 2, an LTE radio frame is illustrated according to various embodiments. The duration of the LTE radio frame is 10 milliseconds (ms). The LTE radio frame is divided into 10 subframes (numbered 0-9) of 1 ms each. Each subframe is divided into two slots of 0.5 ms each. Each slot is divided into seven Orthogonal Frequency Division Multiplexing ("OFDM") symbols (numbered 0-6). Each symbol has a duration of 71 microseconds.

In standard LTE function, a device, also referred to as user equipment ("UE"), first finds the PSCH. The PSCH may be located in the last OFDM symbol of first time slot of the first subframe of a radio frame (i.e. symbol 6 of slot 0 of subframe 0). This may enable the device to be synchronized on a subframe level. The PSCH may provide the device with the cell ID. The device then finds the SSCH. The SSCH may be located in the same subframe of the PSCH, but in the symbol before the PSCH (i.e. symbol 5 of slot 0 of subframe 0). The PSCH may provide the cell ID group, which method of duplexing is used, and the cyclic prefix length. The PSCH may also allow the device to detect when each radio frame starts. The device may then be able to obtain the physical layer cell identity group number (from 0 to 167). The device may then access the PBCH to synchronize with the LTE tower. The PBCH is located in symbols 0-3 of slot 1 of subframe 0. Once the device has accessed the PSCH, the SSCH, and the PBCH, the device is synchronized. If the device is unable to correctly receive the signal in any of the PSCH, the SSCH, or the PBCH, the device will be unable to communicate with the LTE cell.

Referring to FIGS. 1 and 2, the authorized transmission unit 140 may transmit noise in at least one of the PSCH, the SSCH, or the PBCH. The noise may be transmitted at a power which is greater than the power transmitted by the LTE tower 110. By jamming only certain channels, the authorized transmission unit 140 may be effective to a greater distance, because less power is required than for traditional barrage jamming. Additionally, jamming only certain channels may allow for the remainder of the LTE radio frame to be utilized.

The commercial device 120 may attempt to synchronize with the LTE tower 110.

However, the noise transmitted by the authorized transmission unit 140 may prevent the commercial device 120 from acquiring the signal from the LTE tower 110. The commercial device 120 may automatically re-tune to another band. In various embodiments, the authorized transmission unit 140 may transmit noise in only one of the PSCH, the SSCH, or the PBCH, or in any combination of the PSCH, the SSCH, and the PBCH.

The standard LTE synchronization procedure may be modified to allow the authorized device 130 to connect to the LTE network. In various embodiments, at least one of the PSCH, the SSCH, or the PBCH may be offset by a known frequency. The authorized device 130 may comprise hardware and/or software which is configured to find the PSCH, the SSCH, or the PBCH at the offset frequency.

In various embodiments, at least one of the PSCH, the SSCH, or the PBCH may be offset by a known time. The authorized device 130 may comprise hardware and/or software which is configured to find the PSCH, the SSCH, or the PBCH at the offset time. In other words, the commercial device 120 may be searching for the SSCH in the fifth symbol of slot 0 of subframe 0. However, the authorized transmission unit 140 may be transmitting noise in the fifth symbol of slot 0 of subframe 0, and the commercial device 120 may receive the signal as either invalid or incorrect. The SSCH broadcast by the LTE tower 110 may be offset to the fifth symbol of slot 0 of subframe 1. The authorized device 130 may search for the SSCH in the new location and receive the correct signal. Similarly, the PSCH, the SSCH, or the PBCH may be offset by any amount of known time such that the authorized device 130 may connect to the LTE network while preventing the commercial device 120 from connecting to the LTE network in the specified spectrum.

In various embodiments, the authorized transmission unit 140 may transmit a bogus synchronization signal at a greater strength than the PSCH from the LTE tower 110. This signal may appear to be synchronized in time with the LTE tower 110, but may provide incorrect cell ID information. The commercial device 120 may attempt to synchronize using the bogus cell ID. Thus, the commercial device 120 will not be able to synchronize with the LTE tower 110. The authorized device 130 may comprise software or hardware which instructs the authorized device 130 to ignore the bogus synchronization signal, and the authorized device 130 may synchronize with the LTE tower 110 using standard synchronization procedures.

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   transmitting, using an authorized transmission unit, noise in a symbol of a radio frame of an LTE network, wherein the symbol contains a channel selected from a group consisting of: a primary synchronization channel, a secondary synchronization channel, or a physical broadcast channel, wherein the noise prevents a commercial device from using the channel to synchronize with a tower in the LTE network,
   wherein the authorized transmission unit transmits the noise at a signal strength greater than the signal strength of the tower in a cell encompassing the tower and the authorized transmission unit;
   offsetting the channel by at least one of a frequency or a time to an offset symbol within the radio frame; and
   transmitting, using the authorized transmission unit, synchronization data in the offset symbol of the radio frame, wherein an authorized device synchronizes with the LTE network using the synchronization data in the offset symbol.

2. The method of claim 1, further comprising transmitting noise in the primary synchronization channel, the secondary synchronization channel, and the physical broadcast channel.

3. The method of claim 1, wherein the channel is offset by an offset frequency.

4. The method of claim 3, further comprising synchronizing with the authorized device at the offset frequency.

5. The method of claim 1, wherein the channel is offset by an offset time.

6. The method of claim 5, further comprising synchronizing with the authorized device at the offset time.

7. The method of claim 1, further comprising transmitting a bogus synchronization signal.

8. The method of claim 7, wherein the bogus synchronization signal provides incorrect cell ID information.

9. An LTE device comprising:
   a transmission module, wherein the LTE device is operable in a standard mode and an authorized mode; and
   an offset module, wherein the offset module stores instructions for obtaining synchronization data in the authorized mode at least one of an offset frequency or an offset time,
   wherein, in the standard mode, the LTE device is configured to synchronize with an LTE network by obtaining the synchronization data from a symbol in a radio frame, wherein, in the authorized mode, the LTE device is configured to obtain the synchronization data at the offset frequency or the offset time in the radio frame, and wherein the LTE device is configured to automatically switch to the authorized mode in response to detecting noise in at least one of a primary synchronization channel, a secondary synchronization channel, or a physical broadcast channel.

10. The LTE device of claim 9, wherein the LTE device is configured to locate at least one of the primary synchronization channel, the secondary synchronization channel, or the physical broadcast channel at the offset frequency.

11. The LTE device of claim 9, wherein the LTE device is configured to locate at least one of the primary synchronization channel, the secondary synchronization channel, or the physical broadcast channel at the offset time.

12. The LTE device of claim 9, wherein the LTE device is configured to ignore a bogus synchronization signal transmitted by an authorized transmission unit.

* * * * *